United States Patent
Ichikawa

(10) Patent No.: US 8,135,442 B2
(45) Date of Patent: Mar. 13, 2012

(54) APPARATUS AND PROGRAM FOR VEHICULAR WIRELESS COMMUNICATION

(75) Inventor: Junichi Ichikawa, Takahama (JP)

(73) Assignee: DENSO CORPORATION, Kariya (JP)

( * ) Notice: Subject to any disclaimer, the term of this patent is extended or adjusted under 35 U.S.C. 154(b) by 798 days.

(21) Appl. No.: 12/217,574

(22) Filed: Jul. 7, 2008

(65) Prior Publication Data

US 2009/0017754 A1 Jan. 15, 2009

(30) Foreign Application Priority Data

Jul. 11, 2007 (JP) .................. 2007-181976

(51) Int. Cl.
*H04M 1/00* (2006.01)
(52) U.S. Cl. ............ 455/569.2; 455/575.9; 455/41.2; 455/99; 455/297; 455/345; 340/928; 235/384; 701/1
(58) Field of Classification Search .......... 455/569.2, 455/569.1, 575.9, 407, 41.2, 63.3, 71, 96, 455/99, 152, 297, 345, 447, 703; 340/928, 340/10.1, 10.3, 12.51, 13.26; 235/384, 380; 701/1, 18, 29
See application file for complete search history.

(56) References Cited

U.S. PATENT DOCUMENTS

| | | | | |
|---|---|---|---|---|
| 5,777,565 A | * | 7/1998 | Hayashi et al. | 340/928 |
| 5,933,097 A | * | 8/1999 | Sakurai et al. | 340/928 |
| 5,952,940 A | * | 9/1999 | Matsumoto | 340/905 |
| 6,081,718 A | | 6/2000 | Ando et al. | |
| 2003/0048769 A1 | * | 3/2003 | Yamashita | 370/347 |
| 2003/0161323 A1 | * | 8/2003 | Harada et al. | 370/395.21 |
| 2004/0010338 A1 | * | 1/2004 | Ogura et al. | 700/214 |

FOREIGN PATENT DOCUMENTS

| | | |
|---|---|---|
| JP | 07-093624 | 4/1995 |
| JP | 11-039523 | 2/1999 |
| JP | 2003-046432 | 2/2003 |
| JP | 2003-259447 | 9/2003 |
| JP | 2007-150859 | 6/2007 |

OTHER PUBLICATIONS

Office action dated Jun. 9, 2009 in corresponding Japanese Application No. 2007-181976.

* cited by examiner

*Primary Examiner* — Shaima Q Aminzay
(74) *Attorney, Agent, or Firm* — Harness, Dickey & Pierce, PLC

(57) ABSTRACT

A communication apparatus for use in a vehicle includes a transmission repeater, a transmission terminator and a re-number unit. In a wireless communication between the communication apparatus and a communication unit in a facility such as a toll collection booth or the like, the transmission repeater transmits transmission data to the communication unit repeatedly until receiving an acknowledgement of reception completion of the transmission data from the communication unit, and the transmission terminator terminates repeated transmissions of the transmission data by the transmission repeater when a number of the repeated transmissions of the transmission data reaches a standard value. Further, the re-number unit changes the number of the repeated transmissions of the transmission data based on a content of the transmission data from the communication unit.

10 Claims, 5 Drawing Sheets

APPARATUS AND PROGRAM FOR VEHICULAR WIRELESS COMMUNICATION

CROSS REFERENCE TO RELATED APPLICATION

The present application is based on and claims the benefit of priority of Japanese Patent Application No. 2007-181976 filed on Jul. 11, 2007, the disclosure of which is incorporated herein by reference.

FIELD OF THE INVENTION

The present disclosure generally relates to a communication apparatus and a program for the communication apparatus for use in a vehicle.

BACKGROUND INFORMATION

Conventionally, a communication unit installed in a facility such as a toll booth of an expressway, a parking or the like and a communication apparatus for use in a vehicle have a wireless communication with each other through a well-known communication technique. In such a technique, the maximum number of data transmissions (i.e., the number of times of repeating data transmission) from the communication apparatus in the vehicle to the communication unit in the facility is determined. For example, Japanese patent document JP-A-H11-39523 (also available as U.S. patent document U.S. Pat. No. 5,952,940) discloses a technique as described above.

The communication apparatus in the above technique repeats data transmission for the maximum number of times if the acknowledgement of the data reception is not coming from the communication unit in the facility, and, after trying data transmission for the maximum number of times, the data transmission is terminated and the process proceeds to the next step.

The maximum number of data transmissions was a fixed number in the conventional technique. For example, an ETC apparatus in the vehicle for electronic toll collection has a fixed number of 127 (i.e., the maximum number of relevant standard) for repeating data transmission due to an importance of the data that is used for toll collection.

However, the fixed number of data transmission does not provide a flexibility for re-transmission of data from the communication apparatus in the vehicle. That is, for example, if changing the number of data re-transmission is not allowed, the communication apparatus has to perform all instances of communication by the same degree of efforts even when data importance varies data to data. In other words, important data may be transmitted for a greater number of times in comparison to the number of transmissions for the less important data, or the number of re-transmissions of the important data might be increased while decreasing the number of data re-transmissions of not-so-important data. Further, for a certain type of data such as probe data that is important because of its real-time characteristics, transmitting newly-generated data may be more beneficial than repeating re-transmission of old data in terms of keeping data freshness.

SUMMARY OF THE INVENTION

In view of the above and other problems, the present invention provides a technique that flexibly changes the maximum number of data re-transmissions from a communication apparatus in a vehicle to a communication unit in a facility.

One of the characteristics of the present invention is that the maximum number of times of data transmission is flexibly changed according to the content of the data that is transmitted from a communication unit in a facility to a communication apparatus in a vehicle. More practically, the number of times of data transmission controlled by a standard value is flexibly changed according to the data. In this controlling scheme, the transmission and re-transmission of data from the facility to the vehicle are flexibly controlled according to a signal from the communication unit in the facility. The facility, in this case, includes a toll booth, a road, a park, a parking space, a retail store, or other human-activity related places.

BRIEF DESCRIPTION OF THE DRAWINGS

Other objects, features and advantages of the present invention will become more apparent from the following detailed description made with reference to the accompanying drawings, in which.

DETAILED DESCRIPTION

First Embodiment

Figure 1:
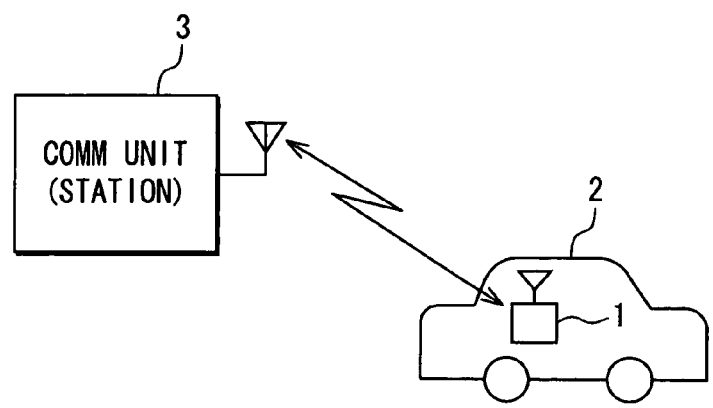
FIG. 1 is an illustration showing a communication system in an embodiment of the present invention.

An embodiment of the present invention is explained in the following. A communication system of the present embodiment is exemplarily shown in FIG. 1. The configuration of the communication system is that:

(1) when a vehicle 2 having Dedicated Short Range Communication (DSRC) capability by using a DSRC vehicle unit 1 enters into a communication range of a facility side radio communicator 3 installed in a facility or a station, (2) data communication through the Dedicated Short Range Communication is performed between the vehicle 2 and the DSRC vehicle unit 1. By the data communication, applications such as a highway toll collection, a parking fee collection, a probe data collection and the like are implemented. In this case, the probe data includes information about the travel situation of the vehicle 2 updated from time to time such as a position of the vehicle 2, a vehicle speed of the vehicle 2, a photographed image around the vehicle 2 and the like, and, with the collection of probe data, the probe data is forwarded to a probe information center (not illustrated) through the facility side radio communicator 3 from the vehicle 2.

Figure 2:
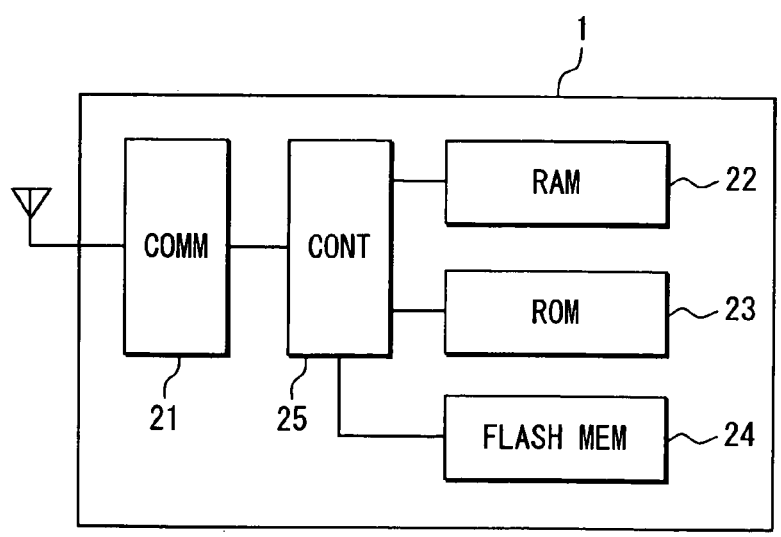
FIG. 2 is a block diagram showing a configuration of a DSRC unit in a vehicle.

Hardware configuration of the DSRC vehicle unit 1 is shown in FIG. 2. The DSRC vehicle unit 1 has a communication unit 21, a RAM 22, a ROM 23, a flash memory 24 and a control unit 25. The communication unit 21 is a circuit performing modulation/de-modulation/frequency conversion to perform communication by DSRC with the facility side radio communicator 3.

The control unit 25 carries out a program recorded to the ROM 23 or the flash memory 24. The data are transmitted to and received from the communicator 3 according to the program with an assistance of the communication unit 21 as required, and the data is read from and written into the RAM 22 and the flash memory 24 with data reading from the ROM 23.

Figure 3:
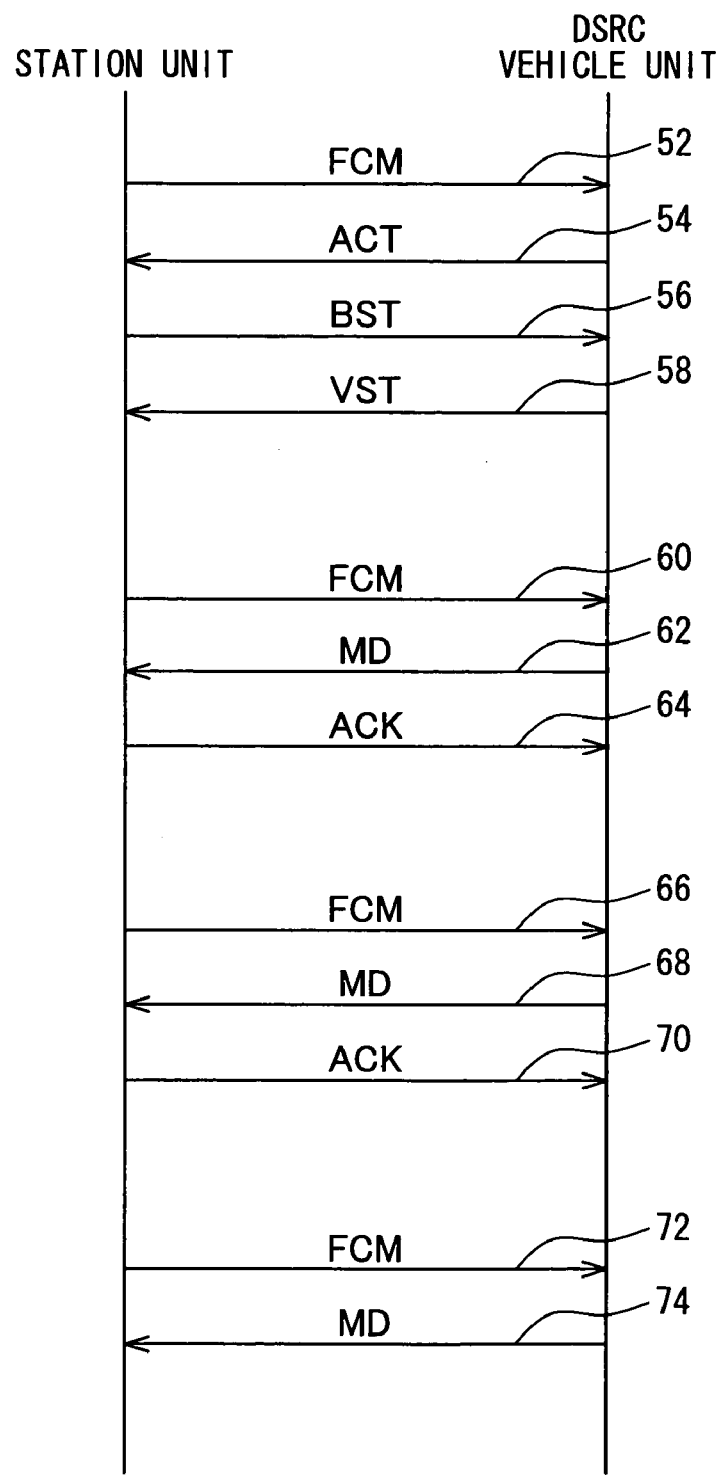
FIG. 3 is a sequence diagram of a process performed in a control unit.

A sequence diagram of FIG. 3 is referred to as an example of an operation of the control unit 25. The facility side radio communicator 3 sends out a Flame Control Message (FCM) signal 52 so that all DSRC in-vehicle units in the communication range can receive the FCM signal 52 which is regulated by a standard of DSRC regulation. When the vehicle 2 enters into the communication range the facility side radio communicator 3, the control unit 25 of the DSRC vehicle unit 1 receives the FCM signal 52 through the communication unit 21. The control unit 25 performs the exchanges of data for radio link establishment with the facility side radio communicator 3 when the data exchange is triggered by the reception the signal 25 through the communication unit 21. More practically, an ACT (Activation) signal 54 defined in the DSRC standard is transmitted for establishing DSRC radio link between the DSRC vehicle unit 1 and the facility side radio communicator 3.

When the facility side radio communicator 3 receives the ACT signal 54, the communicator 3 transmits a Beacon Service Table (BST) signal 56 defined in the standard of DSRC by specifying the DSRC vehicle unit 1 as a destination address. When the control unit 25 receives this the BST signal 56, a Vehicle Service Table (VST) signal 58 defined in the standard of DSRC is generated, and the signal 58 is transmitted to the facility side radio communicator 3. When communication protocol described above has succeeded, the DSRC vehicle unit 1 and the facility side radio communicator 3 are linked through the established radio communication. In addition, the BST signal 56 is an example of data transmitted from the facility side radio communicator 3 to the DSRC vehicle unit 1 for the first time at a communication start time with the destination address of the DSRC vehicle unit 1 specified therein.

In the establishment the radio link, the exchanges of the data according to the application to be realized are performed between the DSRC vehicle unit 1 and the facility side radio communicator 3. For example, the control unit 25 generates data to transmit when a need to transmit a certain data to the facility side radio communicator 3 from the DSRC vehicle unit 1 arises for the realization of the application. The data to be generated may be acquired from the ROM 23, the flash memory 24 or the like, or may be acquired from information collection devices (not illustrated) such as, for example, a GPS receiver, a vehicle speed sensor, an in-vehicle camera or the like. In addition, the data concerned is divided into transmittable quantity when the total amount of generated data exceeds the transmittable quantity for one data transmission.

Then, the control unit 25 waits for the FCM signal 60 to be transmitted from the facility side radio communicator 3, and, when the control unit 25 receives the FCM signal 60, the control unit 25 transmits an MD signal 62 including generated data or a part of the generated data divided therefrom according to the instruction content of the FCM signal 60. The facility side radio communicator 3 which has received the MD signal 62 transmits, back to the DSRC vehicle unit 1, an ACK signal 64 showing the completion of a normal reception of the MD signal 62 concerned normally. The ACK signal is equivalent to the notice of reception completion.

Further, an MD signal 68 including the remainder of the data which should be transmitted for the realization of the application is transmitted by the control unit 25 when an FCM signal 66 from the facility side radio communicator 3 is received after waiting for the FCM signal 66. The facility side radio communicator 3 which has received the MD signal 68 transmits, to the DSRC vehicle unit 1, an ACK signal 70 showing the completion of the normal reception of the MD signal 68.

Furthermore, the MD signal 68 including remaining division data is transmitted when the control unit 25 waits for the FCM signal from the facility side radio communicator 3 until receiving it in a case there is the remainder of the division data which should be transmitted. Then, according to the instruction contents of the FCM signal 66 concerned, the facility side radio communicator 3 which has received the MD signal 68 transmits the ACK signal 70 showing the completion of the normal reception of the MD signal 68 back to the DSRC vehicle unit 1.

In addition, the facility side radio communicator 3 transmits an FCM signal 72 to the DSRC vehicle unit 1 when a need to transmit data to the DSRC vehicle unit 1 from the facility side radio communicator 3 for the realization of the application arises, and after the signal transmission, an MD signal 74 including the data which should be transmitted is transmitted to the facility side radio communicator 3. The control unit 25 of the DSRC vehicle unit 1 receives the MD signal 74 according to instructions of the FCM signal 72.

There is, in an operation of the control unit 25, a case that an ACK signal does not reach the DSRC vehicle unit 1 from the facility side radio communicator 3 even though an MD signal (equivalent to an example of a transmission signal) has been transmitted to the facility side radio communicator 3 from the DSRC vehicle unit 1. For example, in the operation shown in FIG. 3, the case that the facility side radio communicator 3 cannot receive the MD signal 68 for a reason such as aggravation of the communication environment or the like may be encountered. Or, the case that the DSRC vehicle unit 1 cannot receive the ACK signal 70 for a reason such as aggravation of the communication environment or the like may be encountered even though the facility side radio communicator 3 has transmitted the ACK signal 70 in the operation as shown in FIG. 3.

Figure 4:
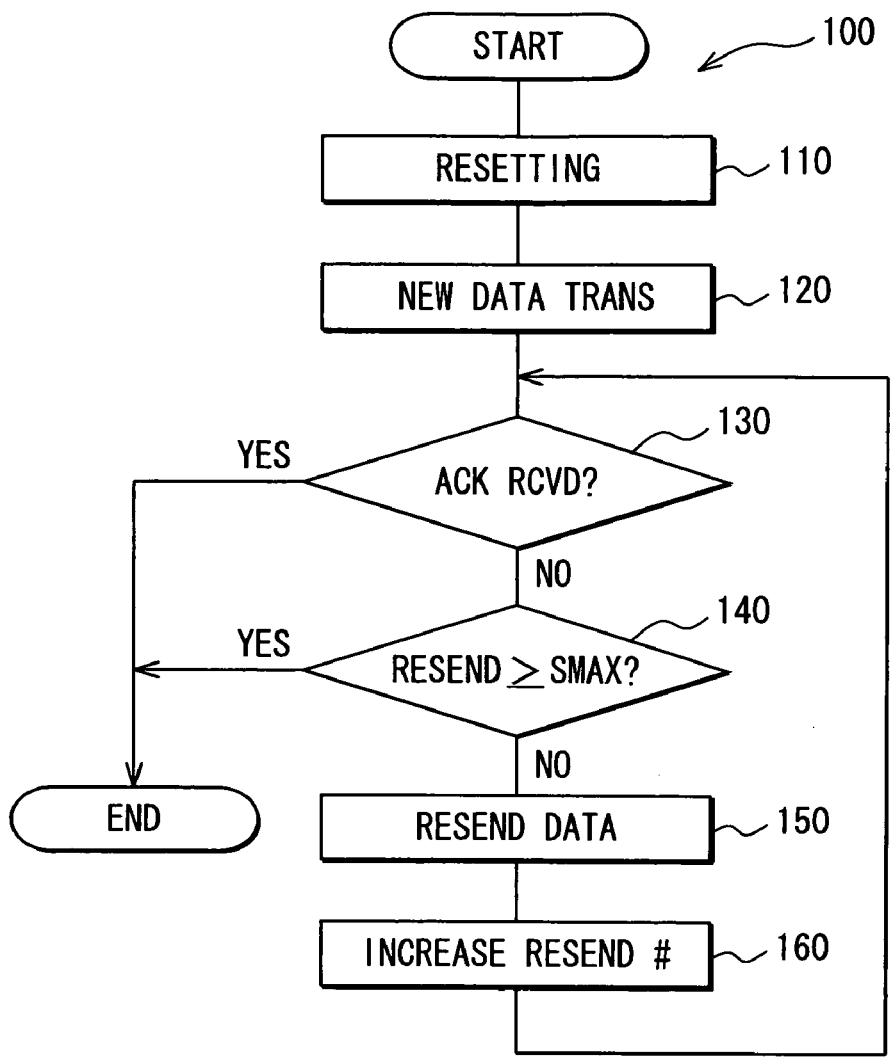
FIG. 4 is a flowchart of a program executed in the control unit.

The control unit 25 carries out a program 100 for retransmission control shown in FIG. 4 to deal with the cases as described above. When data (or, division data) is transmitted as an MD signal, the control unit 25 starts execution of the program 100, and at first a parameter or a variable to show the retransmission number of times is reset to zero in step 110. In step 120, the reception of the FCM signal (i.e., new data transmission) is waited for successively, and the data concerned are transmitted upon receiving the signal. That is, the signal reception triggers the transmission.

Then, the process determines whether an ACK signal has been received in step 130 within a scheduled period. When the ACK signal has been received within a scheduled period, execution of the program 100 is finished, and subsequent processing such as the transmission of new data to the facility side radio communicator 3, the reception of data from the facility side radio communicator 3, other arithmetic processing or the like is performed.

When an ACK signal has not been received within the scheduled period, whether the variable of the retransmission number of times (i.e., RESEND) is equal to or is exceeding an upper limit number SMAX is determined. If the value of the variable is equal to or greater than the upper limit number of times SMAX, execution of the program 100 is finished to proceed to the subsequent processing. If the variable indicates the number that is smaller than the upper limit SMAX, the process performs step 150 successively.

In step 150, the reception of the FCM signal is being waited for, and same data as has been transmitted in step 120 is retransmitted at the reception of the FCM signal that serves as a transmission trigger. Then, the variable of the retransmission is incremented by 1 in step 160, and step 130 is carried out again afterwards.

The control unit 25, by carrying out the program 100, transmits transmission data to the facility side radio communicator 3 (cf. step 120), and repeats the transmission of the transmission data (cf. step 150) until the data of the ACK signal in response to the transmission data is received from the facility side radio communicator 3 (cf. step 130). When the ACK signal is received (cf. step 130), the process proceeds to the next processing.

However, when the number of times of the retransmission of data transmission has reached the upper limit number SMAX (equivalent to the standard value) (cf. step 140) even if the ACK signal is not received (cf. step 130), the retransmission of data is finished to proceed to the next processing.

Figure 5:
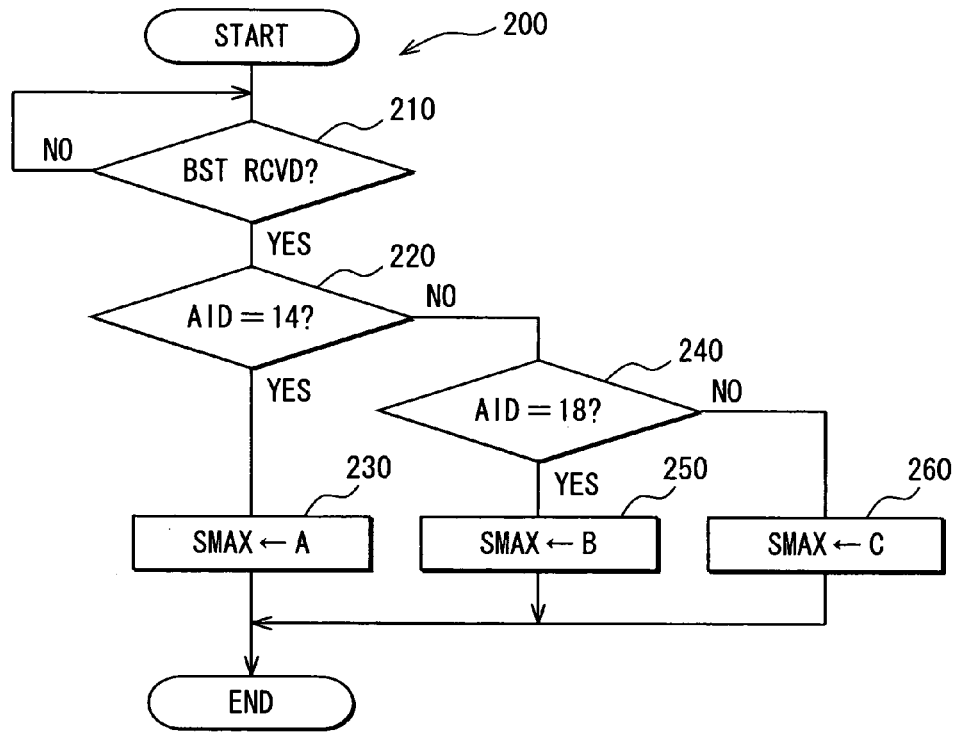
FIG. 5 is a flowchart of another program executed in the control unit.

In addition, the control unit 25 carries out a program 200 shown in FIG. 5 repeatedly to set a value of the upper limit number SMAX. In execution of the program 200, the control unit 25 waits for the reception of the BST signal which is transmitted from the facility side radio communicator 3 to be addressed to the DSRC vehicle unit 1 in step 210 at first, and determines whether the value of a DSRC Application Entity ID (AID) data in the BST signal is 14 in step 220.

The AID data is the data to be included in a BST signal, and, according to the standard of DSRC, it is a value to specify the application type that the facility side radio communicator 3 offers. When the value of the AID data is "14," that specifies that the offered application is an electronic toll collection (ETC). When the value of the AID is "18," that indicates that the offered application is DSRC communication application other than the ETC such as a parking lot fee collection, a probe data collection or the like.

If the value of AID data is 14, a value of the upper limit number SMAX is set to a value A in step 230 successively. When the value of AID data is not "14," the value of AID data is examined in step 240 successively if it is "18." When the value of AID data is "18," step 250 is carried out successively, and the value of the upper limit number SMAX is set to a value B. When the value of the AID data is not "18," step 260 is carried out successively, and the value of the upper limit number SMAX is set to a value C. After steps 230, 250, 260, one cycle of execution of the program 200 is finished.

The control unit 25 determines, based on information of the offered application type that is indicated by the BST signal, the upper limit number SMAX and the relation between application type and the upper limit number SMAX determined beforehand by carrying out the program 200.

The relations of values A, B, and C are explained in the following. The values of A, B, and C are fixed and set beforehand (at the time of, for example, production of the DSRC vehicle unit 1). The values of A, B, and C may be arbitrarily determined.

For example, because the data transmitted by the DSRC vehicle unit 1 for the ETC system is important in terms of toll collection, the value A is set to 127 which is the maximum of the standard of DSRC, and the value B may be set to one that is smaller than 127, that is, for example, a value of 63.

The DSRC vehicle unit 1 changes the upper limit value SMAX of the data retransmission to the facility side radio communicator 3 from the DSRC vehicle unit 1 based on the contents of the data which has been transmitted from the facility side radio communicator 3 as explained above. The DSRC vehicle unit 1 can control and perform the flexible retransmission according to a signal from the facility side radio communicator 3 in this manner.

In addition, when the retransmission number reaches the upper limit number SMAX without successfully transmitting the transmission data to the facility side radio communicator 3 thereby finishing the retransmission, the facility side radio communicator 3 may transmit a request signal to the DSRC vehicle unit 1 for resuming the retransmission of the transmission data from the DSRC vehicle unit 1.

In addition, the DSRC vehicle unit 1 is configured to change the number of retransmission based on the contents of the BST data which is the data transmitted for the first time at a start of the communication with the facility side radio communicator 3 with the destination address of the in-vehicle communication apparatus. That is, the standard value is changed at the start of the communication for setting the upper limit number SMAX of the retransmission can be set for every communication with the facility side radio communicator 3 in the above-described manner. In other words, a certain upper limit number is set for communication with one facility side radio communicator 3, and another upper limit number is set for communication with a different facility side radio communicator 3.

In addition, the DSRC vehicle unit 1 determines the standard value based on information on a service type offered by the communicator 3 transmitted from the communicator 3 as well as a predetermined relation of the service type and the standard value.

In the above-described manner, the facility side radio communicator 3 is not required to increase a transmission data volume that indicates the upper limit number of the retransmission by the DSRC vehicle unit 1, thereby enabling the DSRC vehicle unit 1 to provide a suitable retransmission control depending on the service type.

In addition, in the embodiment mentioned above, the DSRC vehicle unit 1 is equivalent to an example of an in-vehicle communication apparatus. Further, the control unit 25 of the DSRC vehicle unit 1 functions as an example of a transmission repeater unit by carrying out steps 120, 130 and 150 of the program 100, and functions as an example of a transmission termination unit by carrying out steps 110, 140, and 160 of the program 100, as well as functions as an example of a re-number unit by carrying the programs 200, 300 or 400.

Second Embodiment

The second embodiment of the present invention is explained in the following. The difference between the second embodiment and the first embodiment exists in that the control unit 25 of the present embodiment executes a program 300 in FIG. 6 instead of the program 200 for setting of the upper limit number SMAX of the retransmission.

In addition, the control unit 25 cancels the retransmission of data, and communication with the facility side radio communicator 3 is restarted from the beginning (more specifically, from the transmission of the ACT signal), if time measurement by a connection timer started after the first transmission of a the transmission data (cf. step 120) reaches a full measurement time without receiving the ACK signal during the execution of the program 100.

The control unit 25 waits for the reception of the BST signal which at first is transmitted from the facility side radio communicator 3 being addressed to the DSRC vehicle unit 1 in the execution of the program 300 in step 310, and, upon receiving the BST signal, reads a value of the upper limit number SMAX of the retransmission in step 320 from a predetermined position in 'parameter' data in the BST signal. The 'parameter' data is the data included in the BST signal for representing various types of information in the DSRC standard.

When the BST signal is transmitted, the facility side radio communicator 3 includes a designated value of the upper limit number SMAX in an appointed position of the parameter data of the BST signals concerned. The designated value that is specified by the facility side radio communicator 3 may be arbitrarily determined. For example, the value may be a fixed value respectively different for each of the facility side radio communicators 3.

In addition, the value may be changed according to the service type to be offered when one facility side communicator provides plural service types. For example, a case that the facility side radio communicator 3 provides an ETC service and a probe information collection service is described in the following. In this case, the facility side radio communicator 3 may determine the value for the probe data collection service to be smaller than the value of the ETC service. This is because, in the probe data collection service, a quick transmission of newer data is more profitable rather than repeating the retransmission of the old data that fails to be transmitted in terms of freshness of the transmission data.

The control unit 25 sets a retrieved value as a new upper limit number of SMAX in step 330 that follows step 320. Then, in step 340, the full measurement time of the connection timer is set as a value that is derived from a multiplication of the SMAX value set in step 330 by a predetermined time, that is, for example, 10 milliseconds, of a frame cycle. After step 340, execution of the program 300 is finished.

The DSRC vehicle unit 1 is, based on the contents of the data which is transmitted from the facility side radio communicator 3, capable of changing the value of the upper limit number of SMAX, that is, the retransmission number of the transmission data to the facility side radio communicator 3 from the DSRC vehicle unit 1. In this manner, the DSRC vehicle unit 1 can achieve the flexible retransmission according to the signal from the facility side radio communicator 3.

Further, the DSRC vehicle unit 1 is, based on the contents of the BST data which is the data transmitted for the first time at the start of the communication with the facility side radio communicator 3 with an address to the in-vehicle communication apparatus, configured to change the standard value. By changing the upper limit number SMAX of the retransmission at the start of the communication, the upper limit number SMAX for respective occasions of communication with the facility side radio communicator 3 can be set. In other words, a certain upper limit number is set for the time of the communication with a certain facility side radio communicator 3, and another upper limit number can be set at the time of the communication with another facility side radio communicator 3.

Furthermore, the DSRC vehicle unit 1 changes a value of the upper limit number SMAX of the retransmission to a designated value according to a received value from the facility side radio communicator 3. In this manner, the upper limit number of the retransmission from the DSRC vehicle unit 1 can directly be specified by the facility side radio communicator 3, thereby enabling a detailed control of retransmission.

In addition, the DSRC vehicle unit 1 restarts the communication with the in-vehicle communication apparatus (i.e., re-establishes the communication link) after canceling the retransmission of the data if non-reception time of the ACK signal from the facility side radio communicator 3 in response to the transmission data exceeds a timer measurement time that increases in proportion to the value SMAX. In this manner, a waiting time for a start of resumed communication can be controlled in association with the upper limit value SMAX of the retransmission. Therefore, the time before finishing the retransmission and restarting the communication can be extended for communication of important data that has to be tried for increased number of times before restarting.

Third Embodiment

Figure 7:
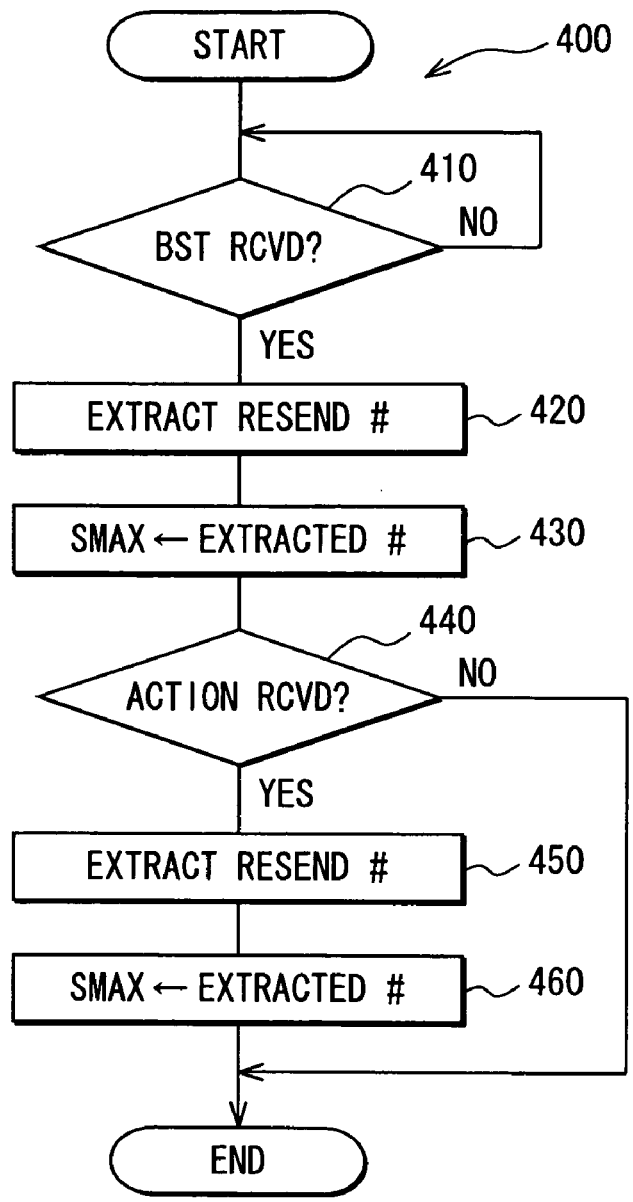
FIG. 7 is a flowchart of still yet another program executed in the control unit in yet another embodiment.

The third embodiment of the present invention is explained in the following. The control unit 25 of the present embodiment executes, instead of the program 200 in the first embodiment, a program 400 for setting the upper limit number SMAX of the retransmission as shown in FIG. 7.

The control unit 25 carries out steps 410, 420, and 430 in execution of the program 400. The processing in those steps is same as the contents of steps 310, 320, and 330 of the program 300 shown in the second embodiment.

In step 440 that follows step 430, the reception of an ActionRequest signal (designated as "ACTION" in FIG. 7) which is transmitted from the facility side radio communicator 3 to be addressed to the DSRC vehicle unit 1 is being waited for, and, upon receiving the signal, a value of the upper limit number SMAX of the retransmission is read in step 450 successively from the predetermined position in actionParameter data in the ActionRequest signal.

The ActionRequest signal (equivalent to an example of data that is addressed to the DSRC vehicle unit 1 except for the acknowledgement of reception completion) is the signal that is defined in the DSRC standard, and is configured to be transmitted for requesting the data transmission for the DSRC vehicle unit 1 after performing exchange of the BST signal and the VST signal between the DSRC vehicle unit 1 and the facility side radio communicator 3. For example, the MD signal 74 in FIG. 3 is an ActionRequest signal. Further, the actionParameter data is the data included in the ActionRequest signal representing various information that conforms to the DSRC standard.

Whenever the ActionRequest signal is transmitted, the facility side radio communicator 3 includes a designated value of the upper limit number SMAX in the predetermined position of the actionparameter data in the ActionRequest signals concerned. The designated value specified by the facility side radio communicator 3 may be an arbitrary value in this case. For example, the value may be a different fixed value for each of the facility side radio communicators. Also, depending on the importance of the transmission data that is requested by the ActionRequest signal concerned, the designated value may be changed.

In step 460 that follows 460, the control unit 25 sets a retrieved value as the new upper limit number SMAX. Then, in step 460, the full measurement time of the connection timer is set as the value that is derived from a multiplication of the SMAX in step 330 by 10 milliseconds successively. After step 460, the execution of the program 400 is finished.

The DSRC vehicle unit 1 is, based on the contents of the data which is transmitted from the facility side radio communicator 3, capable of changing the value of the upper limit number of SMAX, that is, the retransmission number of the transmission data to the facility side radio communicator 3 from the DSRC vehicle unit 1. In this manner, the DSRC vehicle unit 1 can achieve the flexible retransmission according to the signal from the facility side radio communicator 3.

In addition, the DSRC vehicle unit 1 is configured to include information on the designated value of the upper limit number of the retransmission in all of the ActionRequest signals which are the data addressed to the in-vehicle communication apparatus except for the reception completion acknowledgement as well as the data addressed to the communication apparatus after the establishment of the wireless communication. Further, the DSRC vehicle unit 1 changes the upper limit number SMAX of the retransmission for every one occasion of data exchanges according to the designated value. In this manner, a more detailed retransmission control can be performed.

Other Embodiments

Although the present invention has been fully described in connection with the preferred embodiment thereof with reference to the accompanying drawings, it is to be noted that various changes and modifications will become apparent to those skilled in the art.

For example, in the first embodiment, in the first embodiment, the control unit 25 determines the upper limit number SMAX based on the AID data in the BST signal. However, the upper limit number SMAX may be determined based on an EID data. The EID data is the data to be included in the BST signal, and, according to the standard of DSRC, it specifies a detailed type of the application that the facility side radio communicator 3 offers.

Figure 6:
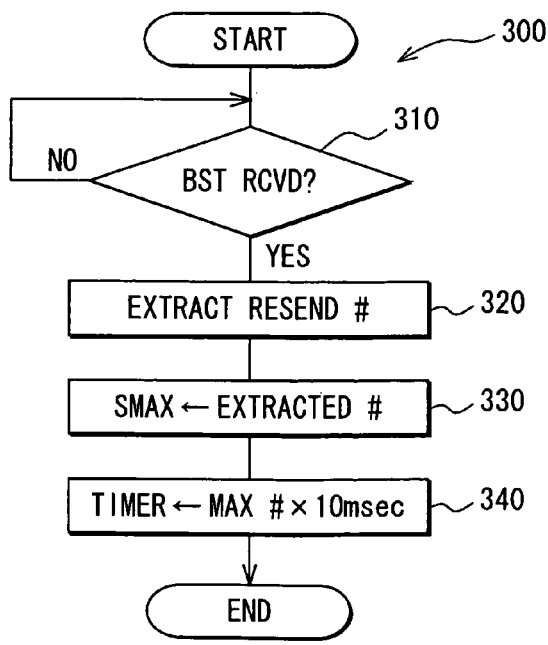
FIG. 6 is a flowchart of yet another program executed in the control unit in another embodiment.

In addition, step 340 of the program 300 shown in FIG. 6 may be performed after step 230, 250, 260 of the program 200 shown in FIG. 2. Further, step 340 may also be performed after step 420 of the program 400 in FIG. 7, or step 340 may also be performed after step 460 of the program 400 in FIG. 7.

In addition, in the second embodiment, the control unit 25 may start the next processing (for example, the transmission of the next data) after having canceled the retransmission of the transmission data when the measurement time of the connection timer started after the first transmission of the transmission data (cf. step 120) reaches the full measurement time without receiving the ACK signal afterwards during the execution of the program 100.

Further, in the above embodiments, the DSRC vehicle unit 1 is exemplified as an in-vehicle communication apparatus. However, the in-vehicle communication apparatus of the present invention can be applied to any communication system as long as the reception completion acknowledgement of the transmission data is transmitted to the DSRC in-vehicle unit from the facility side radio communicator. For example, the present invention can be applied to wireless LAN (IEEE802.11a, b, g, p and the like), Bluetooth or similar communication systems.

Furthermore, each function that is implemented by the execution the program by the control unit 25 may also be implemented by using hardware such as a FPGA that has a programming capability of such functions.

Such changes and modifications are to be understood as being within the scope of the present invention as defined by the appended claims.

What is claimed is:

1. A communication apparatus for use in a vehicle, wherein a data communication is established wirelessly between the communication apparatus and a communication unit that is installed in a station, the communication apparatus comprising:
a transmission repeater unit transmitting transmission data to the communication unit repeatedly until receiving an acknowledgement of a reception completion of the transmission data from the communication unit;
a transmission termination unit terminating repeated transmissions of the transmission data by the transmission repeater unit when a number of repeated transmissions of the transmission data reaches a standard value; and
a re-number unit changing the standard value of the repeated transmissions of the transmission data based on content of the transmission data from the communication unit; wherein
the communication unit transmits a Beacon Service Table (BST) signal that includes an Application Entity ID (AID) data value for specifying an application type, and further wherein the re-number unit changes the standard value of the repeated transmissions of the transmission data based on the AID data value; and
the re-number unit decreases the standard value of the repeated transmissions in a case that the AID data value indicates that the application type provided by the communication unit is not the electronic toll collection application, in comparison to a case that the AID data value indicates that the application type provided by the communication unit is an electronic toll collection application.

2. The communication apparatus of claim 1, wherein the re-number unit changes the standard value based on the content of the transmission data firstly bound for the communication apparatus from the communication unit at a start time of the communication with the communication unit.

3. The communication apparatus of claim 1, wherein the re-number unit determines the standard value by using a relation between each of service types and the standard value based on service type information from the communication unit that indicates one of the service types provided by the communication unit.

4. The communication apparatus of claim 1, wherein the re-number unit changes the standard value according to a maximum number of the repeated transmissions from the communication unit.

5. The communication apparatus of claim 4, wherein the re-number unit changes the standard value according to the maximum number of the repeated transmission included in the transmission data that is bound for the communication apparatus from the communication unit with an exception that the transmission data is used to represent the acknowledgement of the reception completion.

6. The communication apparatus of claim 1, wherein when a no-reception period of not receiving the acknowledgement of the reception completion from the communication unit exceeds a timer period that is defined in proportion to the standard value, the repeated transmissions of the transmission data by the transmission repeater unit is terminated.

7. A method of controlling a computer to be serving as a communication apparatus for use in a vehicle to establish a wireless communication with a communication unit that is installed in a station, the method comprising:
transmitting transmission data to the communication unit repeatedly until receiving an acknowledgement of reception completion of the transmission data from the communication unit;
terminating repeated transmissions of the transmission data when a number of the repeated transmissions of the transmission data reaches a standard value;
changing the standard value of repeated transmissions of the transmission data based on content of the transmission data from the communication unit. ",transmitting a beacon Service Table (BST) signal that includes an Application Entity ID (AID) data value for specifying an application type; and changing the standard value on the repeated transmission of the transmission data based on the AID value includes decreasing the standard value of the repeated transmissions in a case that the AID value indicates that the application type provided by the communication unit is not an electronic toll collection application in comparison to a case that the AID value indicates that the application type provided by the communication unit is the electronic toll collection application ".

8. A communication system comprising:

a first communication unit installed in a station;

a second communication unit in a vehicle that wirelessly communicates with the first communication unit, the second communication unit including a transmission repeater unit, a transmission termination unit, and a re-number unit; wherein the transmission repeater unit transmits transmission data to the first communication unit repeatedly until an acknowledgement of a reception completion of the transmission data from the first communication unit is received;

the transmission termination unit terminates repeated transmissions of the transmission data by the transmission repeater unit when a number of repeated transmissions of the transmission data reaches a standard value;

the re-number unit changes the standard value of repeated transmissions of the transmission data based on content of the transmission data from the first communication unit;

the first communication unit transmits a Beacon Service Table (BST) signal that includes an Application Entity ID (AID) data value for specifying an application type, and further wherein the re-number unit changes the standard value of the repeated transmissions of the transmission data based on the AID data value; and the re-number unit decreases the standard value of the repeated transmissions in a case that the AID data value indicates that the application type provided by the communication unit is not the electronic toll collection application, in comparison to a case that the AID data value indicates that the application type provided by the communication unit is an electronic toll collection application.

9. The communication system of claim 8, wherein the first communication unit transmits a maximum number of the standard value to the second communication unit.

10. The communication system of claim 9, wherein the first communication unit transmits the maximum number of the standard value as the transmission data to the second communication unit with an exception that the transmission data is used to represent the acknowledgement of the reception completion.

* * * * *